(12) United States Patent
El Kaed et al.

(10) Patent No.: US 11,698,902 B2
(45) Date of Patent: *Jul. 11, 2023

(54) SEMANTIC SEARCH SYSTEMS AND METHODS FOR A DISTRIBUTED DATA SYSTEM

(71) Applicant: SCHNEIDER ELECTRIC USA, INC., Andover, MA (US)

(72) Inventors: Charbel Joseph El Kaed, New York City, NY (US); Philippe Nappey, Le Sappey en Chartreuse (FR); Hervé Jacquet, Saint Paul de Varces (FR)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/383,694

(22) Filed: Jul. 23, 2021

(65) Prior Publication Data

US 2021/0349889 A1 Nov. 11, 2021

Related U.S. Application Data

(63) Continuation of application No. 16/088,845, filed as application No. PCT/US2017/025064 on Mar. 30, 2017, now Pat. No. 11,074,251.

(Continued)

(51) Int. Cl.
*G06F 7/02* (2006.01)
*G06F 16/00* (2019.01)
(Continued)

(52) U.S. Cl.
CPC .......... *G06F 16/243* (2019.01); *G06F 9/3001* (2013.01); *G06F 16/2458* (2019.01);
(Continued)

(58) Field of Classification Search
CPC .. G06F 16/243; G06F 16/2458; G06F 16/284; G06F 16/9035; G06F 16/24526; G06F 40/30; G06F 9/3001; H04W 4/70
See application file for complete search history.

(56) References Cited

U.S. PATENT DOCUMENTS

| | | |
|---|---|---|
| 2008/0052275 A1 | 2/2008 | Kantak et al. |
| 2011/0196852 A1 | 8/2011 | Srikanth et al. |

(Continued)

FOREIGN PATENT DOCUMENTS

| | | |
|---|---|---|
| CA | 2886603 A1 | 4/2014 |
| WO | 0161568 A2 | 8/2001 |

(Continued)

OTHER PUBLICATIONS

Dibley, Michael et al, "An Ontology Framework for Intelligent Sensor-Based Building Monitoring," Automation in Construction, vol. 28 pp. 1-14, 2012. (Year: 2012).*

(Continued)

*Primary Examiner* — Bruce M Moser
(74) *Attorney, Agent, or Firm* — Lando & Anastasi, LLP

(57) ABSTRACT

Methods and systems are provided for searching information in a distributed data processing system. A system for processing a semantic search query where the system may include a memory and a processor coupled to the memory being configured to, receive a structured search query, process the structured search query to deconstruct into query elements, identify a set of connected elements that define a data source associated with the received structured search query based on a processed query element, process the query elements to determine one or more command data element types associated with the received structured search query, and process data associated with the defined data source according to a command data element type to develop a semantic search query resultant data set.

17 Claims, 13 Drawing Sheets

Related U.S. Application Data

(60) Provisional application No. 62/316,222, filed on Mar. 31, 2016.

(51) Int. Cl.

| | | |
|---|---|---|
| *G06F 16/242* | (2019.01) | |
| *H04W 4/70* | (2018.01) | |
| *G06F 16/2458* | (2019.01) | |
| *G06F 16/28* | (2019.01) | |
| *G06F 16/9035* | (2019.01) | |
| *G06F 40/30* | (2020.01) | |
| *G06F 9/30* | (2018.01) | |
| *G06F 16/2452* | (2019.01) | |

(52) U.S. Cl.
CPC ...... *G06F 16/24526* (2019.01); *G06F 16/284* (2019.01); *G06F 16/9035* (2019.01); *G06F 40/30* (2020.01); *H04W 4/70* (2018.02)

(56) References Cited

U.S. PATENT DOCUMENTS

| | | |
|---|---|---|
| 2013/0190943 A1 | 7/2013 | Wester et al. |
| 2013/0212129 A1 | 8/2013 | Lawson et al. |
| 2015/0227618 A1 | 8/2015 | Dong et al. |
| 2015/0254230 A1 | 9/2015 | Papadopoullos et al. |
| 2015/0261863 A1 | 9/2015 | Dey et al. |
| 2016/0344808 A1* | 11/2016 | Smith .............. H04L 67/12 |
| 2017/0193417 A1 | 7/2017 | Syed |

FOREIGN PATENT DOCUMENTS

| | | |
|---|---|---|
| WO | 2012123523 A1 | 9/2012 |
| WO | 2014047727 A1 | 4/2014 |

OTHER PUBLICATIONS

Datta Soumya Kanti et al : "0neM2M Architecture Based User Centric IoT Application Development", 2015 3rd International Conference on Future Internet of Things and Cloud, IEEE, Aug. 24, 2015 (Aug. 24, 2015), pp. 100-107, XP032798274, DOI: 10.1109/FICLOUD.2015.7 [retrieved on Oct. 19, 2015].

Li Hong Kun et al : "Enabl i ng Semanti cs i n an M2M/I oT Servi ce Del i very Pl atform", 2016 IEEE Tenth Internati onal Conference on Semanti c Computi ng (I CSC), IEEE, Feb. 4, 2016 (Feb. 4, 2016), pp. 206-213, XP032886254, DOI: 10.1109/ICSC.2016.28 [retri eved on Mar. 22, 2016].

Notification of Transmittal of the International Search Report and the Written Opinon of the International Searching Authority from corresponding PCT/US2017/025064 dated Jun. 22, 2017.

* cited by examiner

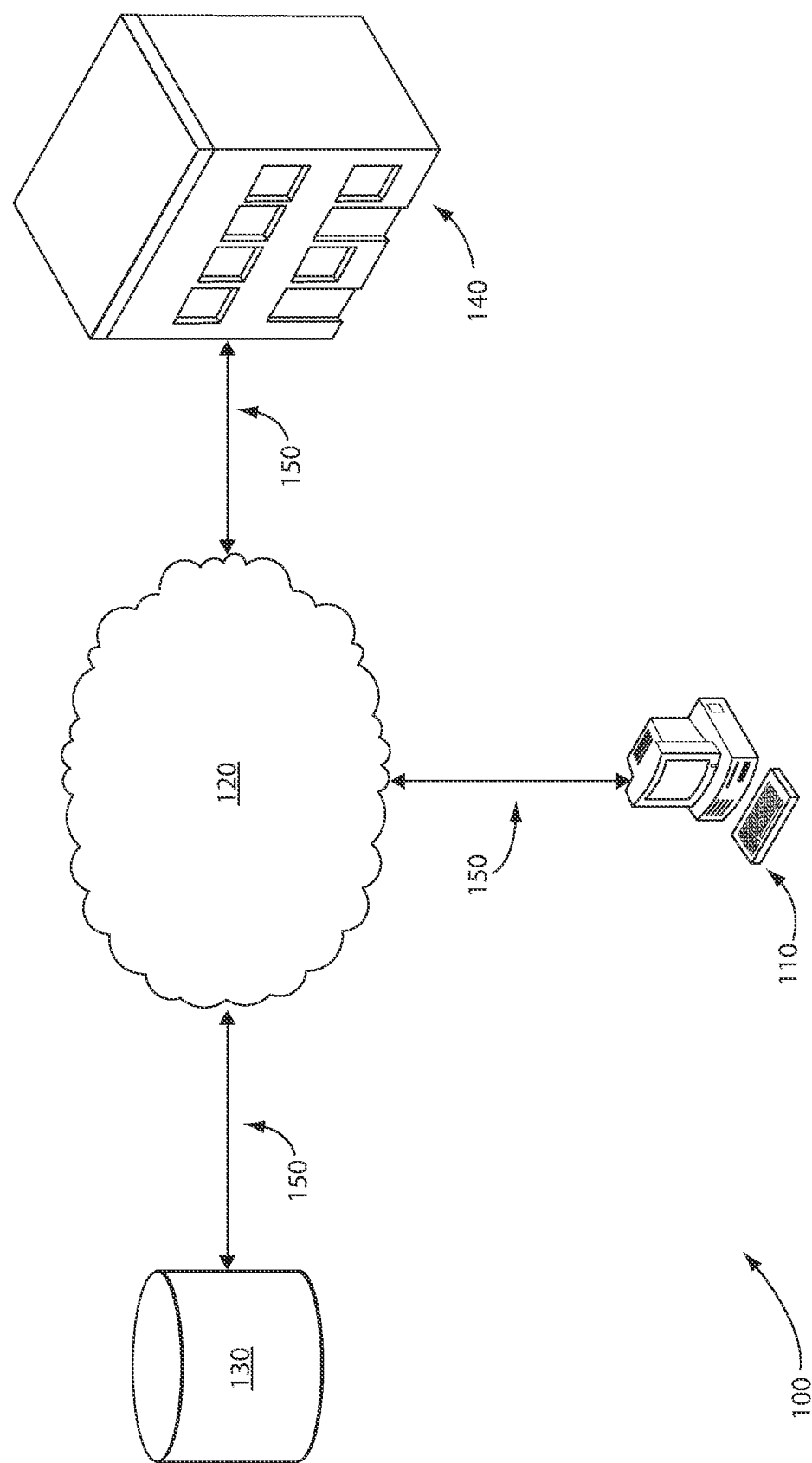

SEMANTIC SEARCH SYSTEMS AND METHODS FOR A DISTRIBUTED DATA SYSTEM

CROSS-REFERENCE TO RELATED APPLICATIONS

This application is a continuation of, and claims priority under 35 U.S.C. § 120 to, U.S. patent application Ser. No. 16/088,845, now U.S. Pat. No. 11,074,251, titled "SEMANTIC SEARCH SYSTEMS AND METHODS FOR A DISTRIBUTED DATA SYSTEM," filed on Sep. 27, 2018, which is a National Stage of International Application No. PCT/US2017/025064, now expired, titled "SEMANTIC SEARCH SYSTEMS AND METHODS FOR A DISTRIBUTED DATA SYSTEM," filed Mar. 30, 2017, which claims priority under 35 U.S.C. § 119(e) to U.S. Provisional Application Ser. No. 62/316,222, now expired, each of which is hereby incorporated by reference in its entirety.

FIELD OF THE INVENTION

Embodiments of the present disclosure relate generally to systems and methods of data processing, and more specifically to systems and methods for querying data associated with a distributed data processing system.

BACKGROUND

Description of the Related Art

The Internet of Things (IoT) promises to interconnect elements together on a massive scale. Such amalgamation allows interactions and collaborations between these elements in order to fulfill one or more specific tasks. Such tasks differ according to the context and environment of application. For example, tasks may range from sensing and monitoring of an environmental characteristic such as temperature or humidity of a single room to controlling and optimization of an entire building or facility in order to achieve a larger objective such as an energy management strategy.

Depending on the application, connected elements may be of heterogeneous and/or homogenous hardware which may facilitate sensing, actuation, data capture, data storage, or data processing. Each type of connected element hardware may have a unique data structure which details a digital representation of the physical capabilities of the hardware itself and/or measured parameters. For example, a temperature sensor may include temperature measurement, MAC address, IP address, and CPU type data. Each connected hardware element may possess a unique data structure. Accordingly, with the heterogeneity of these various data structures available through the wide variety of available hardware, efficiently analyzing this data becomes a serious challenge.

SUMMARY

Methods and systems are provided for searching information in a distributed data processing system. A system for processing a semantic search query where the system may include a memory and a processor coupled to the memory being configured to, receive a structured search query, process the structured search query to deconstruct into query elements, identify a set of connected elements that define a data source associated with the received structured search query based on a processed query element, process the query elements to determine one or more command data element types associated with the received structured search query, and process data associated with the defined data source according to a command data element type to develop a semantic search query resultant data set.

Principles of the disclosure demonstrate the structured search query may be configured with a particular grammar. Further, the particular grammar may include query elements that facilitate filtering, aggregation, publish, subscribe, and/or inferential functions. A defined data source may be filtered for a data field associated with one or more connected elements. An associated filtered data fields may be selected from a group including device type, class, capability, and/or communication protocol. A defined data source may be aggregated using a mathematical operation. A mathematical operation may include min, max, sum, and/or average. A defined data source may be published and/or subscribed for connected elements. A defined data source may infer a relationship between connected elements. Inferring relationships between connected elements may be determined by ontological operations. An ontological operation may include developing graphical data structure with device and device location data relationships.

Principles of the disclosure further demonstrate, a data source defined for the semantic search query may be constructed using semantic tagging which may correlates with one or more connected elements. A command data element may include operational elements for actuating at least one of the connected elements associated with the defined data source. Alternate embodiments may provide for identifying actionable connected elements within the defined data source and/or updating a data value associated with a connected element.

Embodiments of the disclosure also provide one or more connected elements may be virtual elements.

BRIEF DESCRIPTION OF THE DRAWINGS

These accompanying drawings are not intended to be drawn to scale. In the drawings, each identical or nearly identical component that is illustrated in various figures is represented by a line numeral. For purposes of clarity, not every component may be labeled in every drawing. In the drawings:

FIG. 1A illustrates aspects of a system for facilitating a semantic search method in accordance with various embodiments of this disclosure;

DETAILED SUMMARY

Figure 1B:
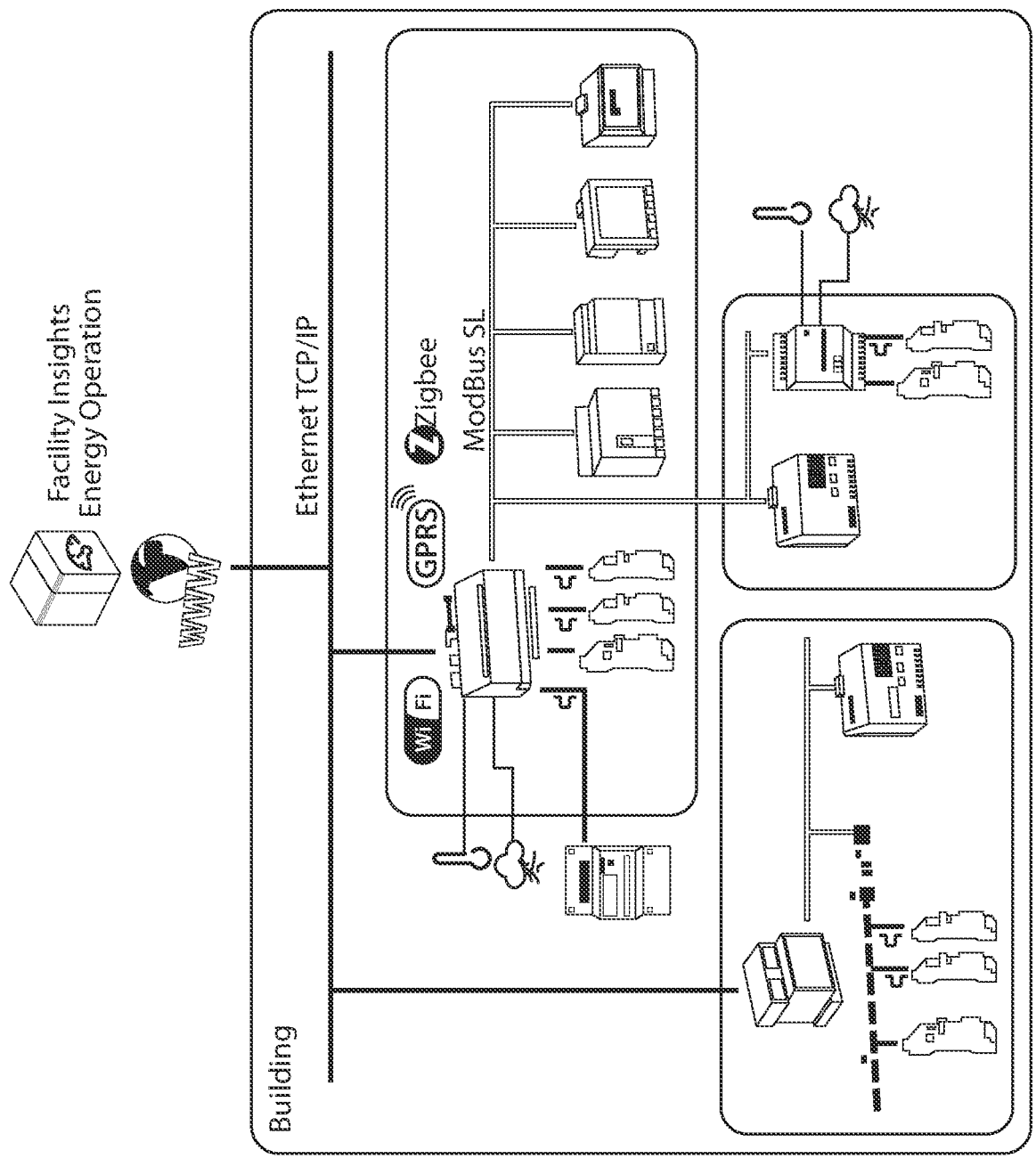
FIG. 1B illustrates another embodiment of aspects of a system for facilitating a semantic search method illustrated in FIG. 1A.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e. "including but not limited to."

In the emerging world of the Internet of Things (IoT) or more generally, Cyber Physical Systems (CPS), a convergence of multiple technologies is underway to allow the sensing, actuation, data capture, storage, or processing from a large array of connected elements. These connected elements may be accessed remotely using existing network infrastructure to allow for efficient Machine to Machine (M2M) and Human to Machine (H2M) communication. During this communication, as the network of connected elements changes over time, an increasing amount of data from these connected elements will be generated and allow for correlations which have not been possible before. Issues of organizing dynamic sets of connected elements are exacerbated by the disparate heterogeneous nature of the associated data structures.

With this plethora of hardware and associated data structures, a problem of organizing and analysis of data emerges as a wide variety of data structures may be received at a single processing point from the vast network of connected elements. A need exists for the ability to process, request, and analyze data from heterogeneous sources from the connected elements. Each individual connected element may contain multiple data characteristics from a data structure that are similar to other individual or group of elements. Yet, even with these similar data characteristics, efficiently querying for these similar data characteristics across the plethora of different connected elements is a significant challenge. One method to solve this problem of data heterogeneity involves the implementation and execution of structured semantic queries.

A solution to the data challenge is the use of structured semantic queries that solves two distinct problems. First, is to solve the issue of data heterogeneity delivered from a connected system which contains various data structures. Second is to filter and aggregate this heterogeneous data from the connected elements and provide only required and relevant data to a user, cloud platform, or other repository.

Example applications of implementation and execution may include, but are not limited to: (1) managing HVAC systems to assure the comfort of facility occupants, (2) maintenance of a particular environmental air quality (which may consist of temperature, humidity, and carbon dioxide content) for storage or occupants and dynamically adjusting a working building environment according to the prevailing weather conditions, (3) manage a facility management through controlling and optimizing regarding energy consumption through active control of lighting, heating, and cooling, and (4) monitor day to day operations, maintenance, and oversight of facility operations. Commercial embodiments of such applications may be a part of building management or automation system.

It is to be understood that the system described herein facilitates significant flexibility in terms of configuration and/or end user application and that although several examples are described a number of alternative embodiment configurations and applications are also possible.

Generally, such tasks require a rich interactive experience which hides the complexity of the data heterogeneity problem. Advantages of the various embodiments contained herein include; allowing for the search of specific connected elements or associated data structures; configuring of alerts and notification messages adhering to a facility specific architecture without intimate knowledge of same; allowing for execution of facility specific queries to determine real-time metrics such as energy consumption by area; and configuring any type of data structure to collect in a manner that does not require translation of units or other specific constructs.

FIG. 1A illustrates a representation of a system for implementation and execution of a semantic search method 100 in which various embodiments of the present disclosure may be implemented. The system for a semantic search method may include one or more general purpose computers 110, one or more data storage arrays 130, a cloud computing environment 120, a building 140 or other structure which contains one or more connected elements (not shown), and network connections 150 to allow the exchange of data between these parts of the system.

In one embodiment of the system illustrated in FIG. 1A, the building 140 contains one or more connected elements that perform sensing, actuation, data capture, storage, or processing for the monitoring or management of the building 140. Any variety of connected elements may be used to capture, store, or process data, or actuate associated devices over the network connections 150, to the cloud computing environment 120, to other parts of the system. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock. Connected elements may also process data structures from other connected elements or propagate data structures from one or more connected elements to one or more other connected elements. Any number of connected elements may be deployed in any combination to monitor or manage a physical space. Examples of such a space may include a closet, room, building, campus, office, promenade, or any other desired location. Further, it is to be understood that connected elements may be physical in nature, virtual in nature, or a combination of both.

Each building 140 containing a connected element may ultimately connect to a cloud computing environment 120 through a network connection 150. This connection allows access to the cloud computing environment 120 by a variety of devices capable of connecting to such an environment in either a wired or wireless connection manner. From FIG. 1A such devices may include one or more general purpose computers 110 capable of receiving input from a user or to provide autonomous operation. One or more data storage arrays 130 may be utilized to provide additional data storage capability. It should be appreciated a cloud computing environment 120, while providing additional communication paths to additional elements or systems, is not required as part of the semantic search method. Other embodiments contemplate self-contained or stand-alone systems.

The network connections 150 may be wired or wireless connection types. Such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or space based communication networks. Access between the cloud computing environment 120 and any other cloud environment is possible in other implementations these other cloud environments are configured to connect with devices similar to cloud environments such as the existing cloud computing environment 120. It is to be understood that the computing devices shown in FIG. 1A are intended to be illustrative only and that computing nodes and cloud computing environments may communicate with any type of computerized device over any type of network with addressable or direct connections.

FIG. 1B illustrates another embodiment of aspects of a system for facilitating a semantic search method illustrated in FIG. 1A. An embodiment of a commercial IoT gateway targeting small to medium facilities, capable of integrating heterogeneous devices and sensors with different communication mechanisms, protocols and data models as shown in FIG. 1B. Embodiments may push data to a cloud platform for storage and/or analysis. For example, at the application level, a query of any collected data may be used for several purposes such as energy efficiency, asset maintenance and management in different market segments like retail or health-care. It is to be understood FIG. 1B is illustrative of many such embodiments and is not limited by the figure.

Figure 2:
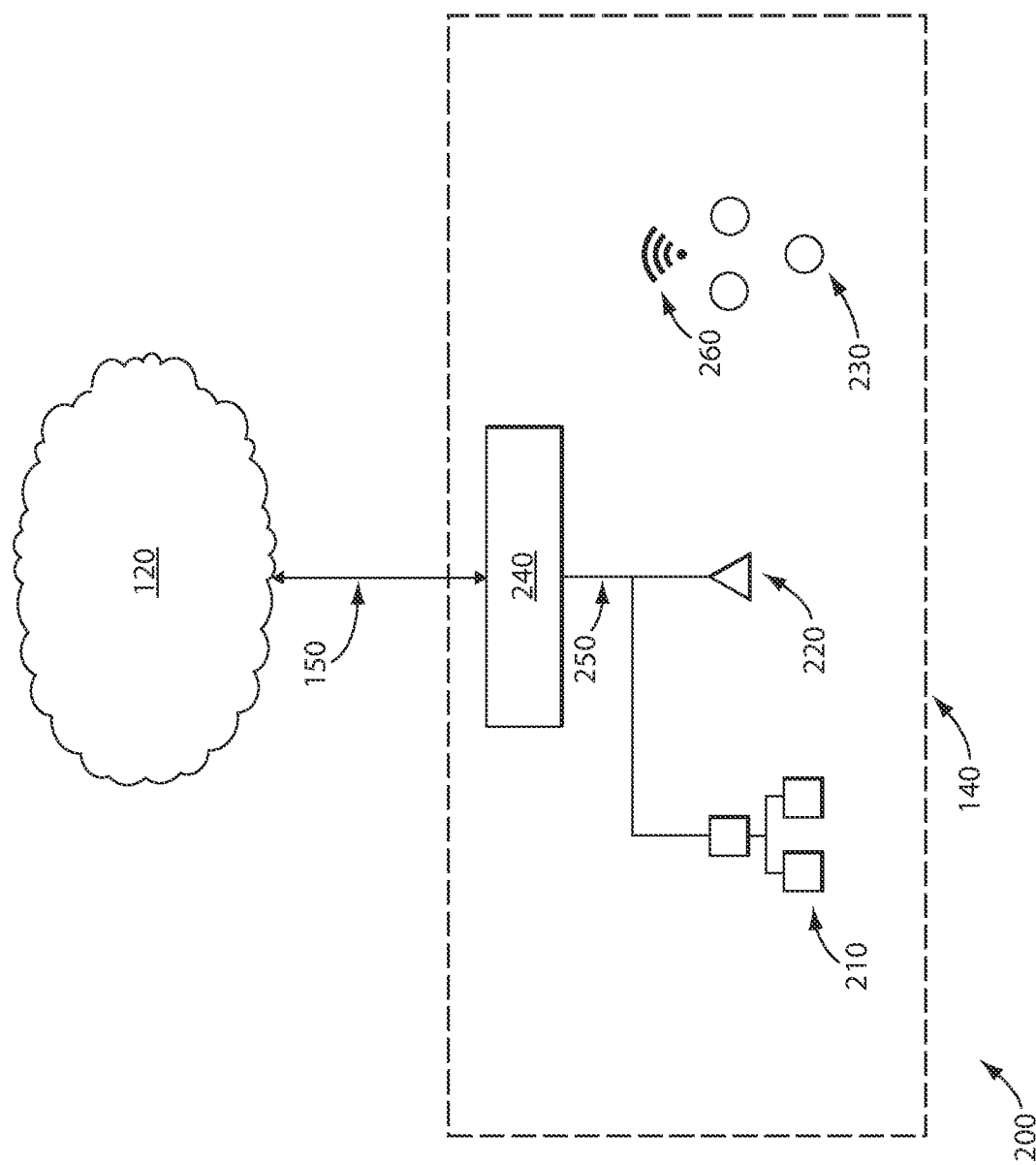
FIG. 2 illustrates aspects of how different types of devices may connect to the system for facilitating a semantic search method in accordance with various embodiments of this disclosure.

FIG. 2 illustrates a representation of a portion of the system for a semantic search method 200 in which various embodiments of the present disclosure may be implemented. In one embodiment of FIG. 2, the building 140 contains one or more types of connected elements 210, 220, 230, 240 for the monitoring or management of the structure. These connected elements 210, 220, 230, 240 communicate via a wired 250 or wireless 260 networks and makes the data structures from each connected element available to the cloud computing environment 120 via the network connections 150.

Any variety of connected elements may be used to perform sensing, actuation, data capture, storage, or processing over the network connection 150, to the cloud computing environment 120, to other parts of the system. For example, connected elements 210 may be connected sensors to measure carbon dioxide for monitoring air quality of the building 140 and communicate via a wired network connection 250. Connected element 220 may be both a connected sensor to detect ambient light and also an actuator to change the state of an occupant light fixture and communicate via a wired network connection 250. Connected elements 230 may be connected sensors for temperature and humidity to monitor environment of the building 140 and communicate via a wireless network connection 260. Finally, connected element 240 serves as a connected gateway to communicate with the associated connected elements 210, 220, 230, via their respective network connections 250, 260, process the data structures of each, and transmit same to a network connection 150 for transmission to the cloud computing environment 120. It should be appreciated a cloud computing environment 120, while providing additional communication paths to additional devices or systems, is not required as part of the semantic search method. Other embodiments contemplate self-contained or stand-alone systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

Figure 3A:
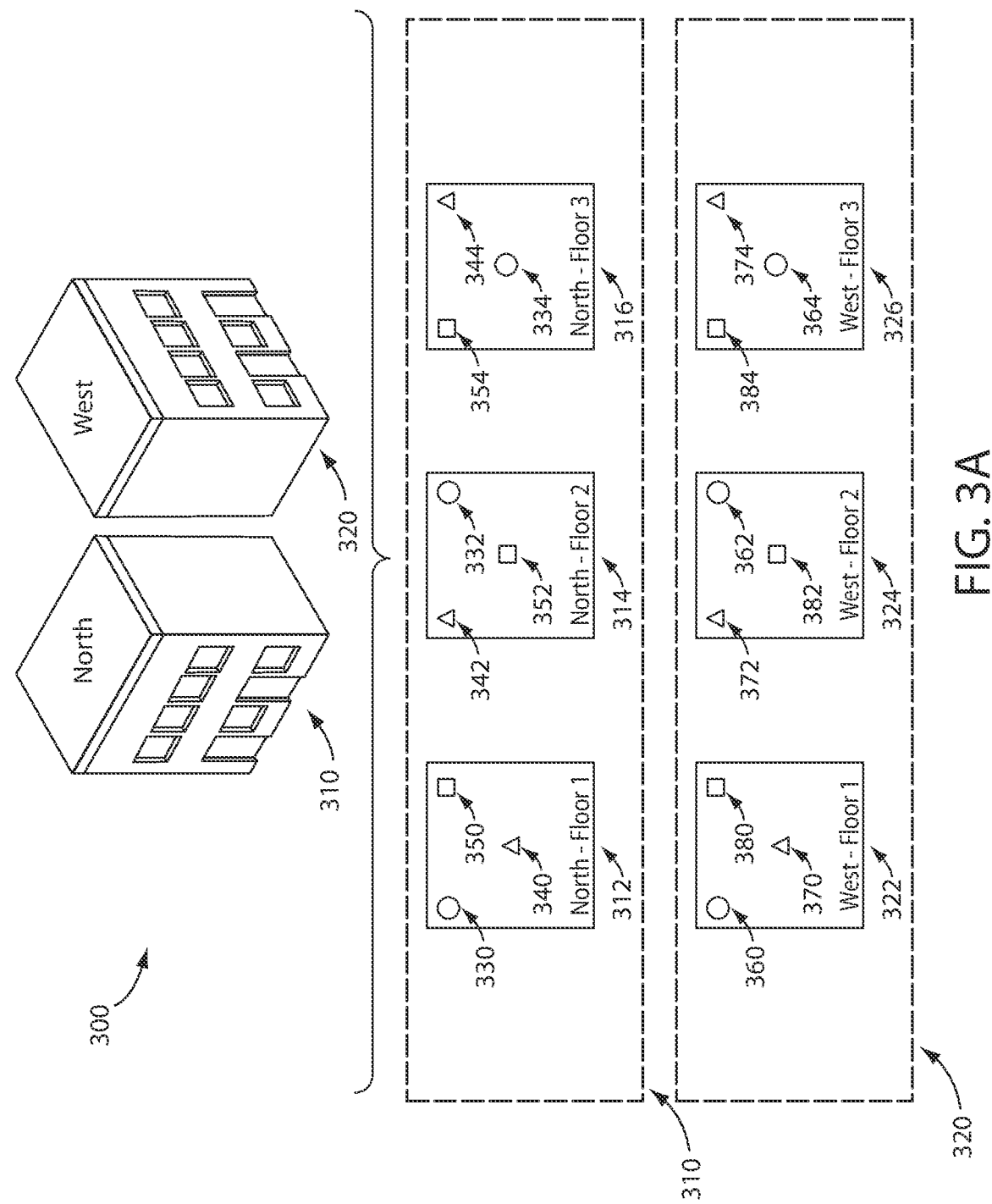
FIG. 3A illustrates an exemplary deployment of various connected elements of the system for facilitating a semantic search method in accordance with various embodiments of this disclosure.

FIG. 3A illustrates exemplary deployment in context of various elements of the system for a semantic search method 300 in which various embodiments of the present disclosure may be implemented. A "North" building 310 and a "West" building 320 are illustrated. Each building has (3) floors associated with each. North Floor (1) 312, North Floor (2) 314, North Floor (3) 316 are contained within the North building 310. West Floor (1) 322, West Floor (2) 324, and West Floor (3) 326 are contained within the West building 320. Each floor has (3) connected elements of different types. For example, connected elements may be connected sensors to measure carbon dioxide 330, 332, 334, 360, 362, 364 for monitoring air quality of the building 310, 320 respectively and communicate via a wired network connection. Connected elements may be both a connected sensor to detect ambient light and an actuator 340, 342, 344, 370, 372, 374 to change the state of an occupant light fixture and communicate via a wired network connection. Connected elements may be connected sensors for temperature and humidity 350, 352, 354, 380, 382, 384 to monitor environment of the building 310, 320 respectively and communicate via a wireless network connection.

Figure 3B:
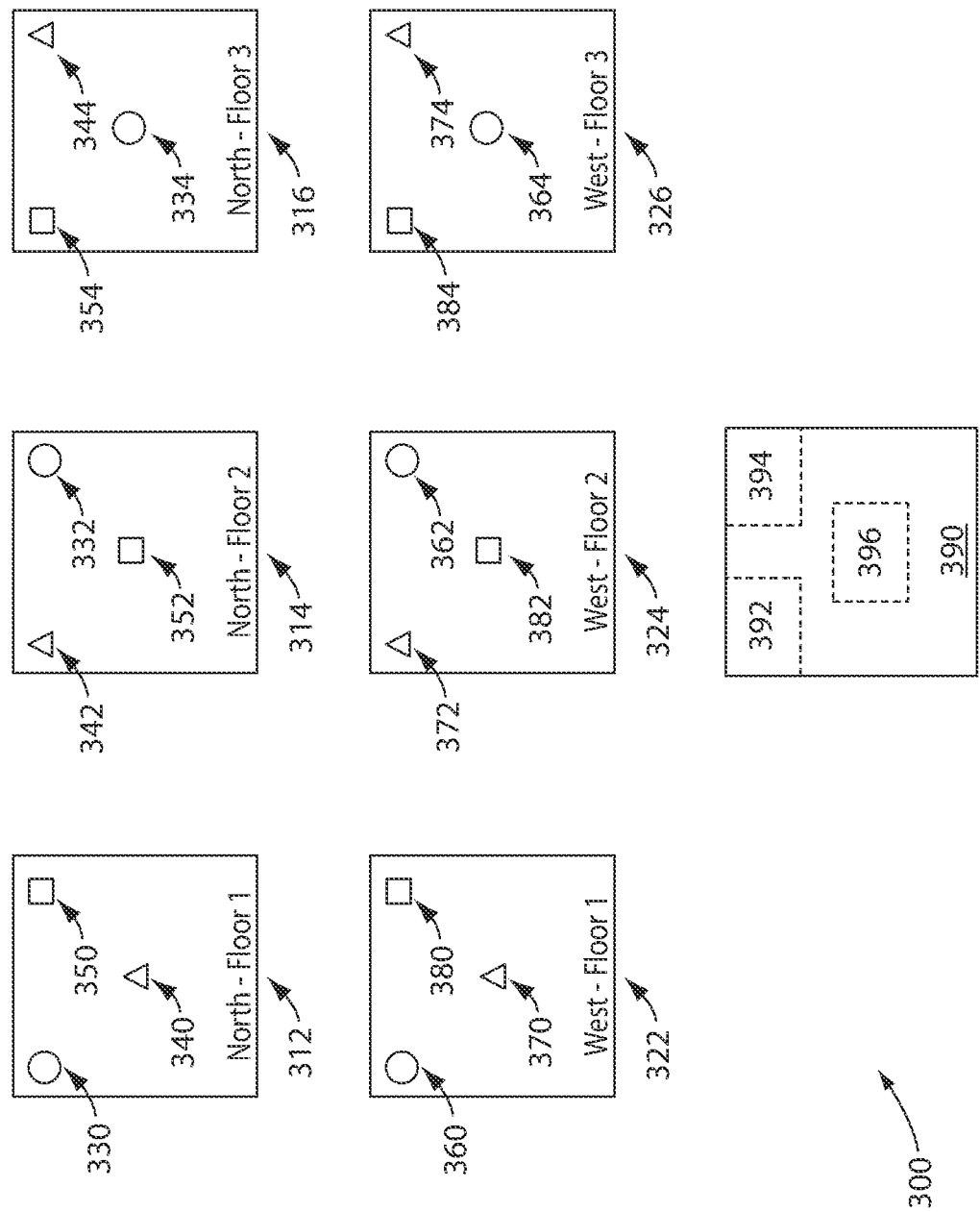
FIG. 3B illustrates exemplary deployment of connected elements across a variety of physical locations of the system that facilitates a semantic search from FIG. 3A.

FIG. 3B illustrates exemplary deployment in context and logical placement of various elements system for a semantic search method 300 in which various embodiments of the present disclosure may be implemented. Within each floor of each building multiple connected elements exist. As an example, temperature and humidity 350, 352, 354, 380, 382, 384 carbon dioxide 330, 332, 334, 360, 362, 364, and ambient light 340, 342, 344, 370, 372, 374 connected elements exist on each floor of each building. Further, each connected element may exist in a distinct zone on each floor of each building. As one of many examples, a general floor plan 390 may indicate zones that are defined as "Zone 1"

392, "Zone 2" 394, and "Zone 3" 396. It should be appreciated that such designations are highly configurable by a user or other system and are shown here for illustrative purposes only.

Given the connected element configuration illustrated in FIGS. 3A and 3B, each connected element possesses a data structure that includes, but not be limited to, sensor specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Once physical connections to the connected elements are put in place or established, a digital representation may be created. This process of translating the physical representation of the system to a homogenized taxonomy called semantic tagging. Semantic tagging links the data structures available from the connected elements of a particular system to a formal naming and definition that actually or possibly exist in physically represented systems, or ontology. For example, ontologies may include definitions such as location, relationships, usage, physical quantities, network protocol, or units.

Semantic tagging may occur in one of two ways, automatic or manual semantic tagging. Automatic semantic tagging is accomplished by the system without user input. In this approach, each data structure for each connected element is examined and deconstructed by the system into corresponding data structure elements. During the identification process, it is determined what data structure elements exist for each connected element. Once each data structure element is defined, it is then mapped to a corresponding taxonomy and tagged with this taxonomy which in turn becomes part of that connect elements data structure. At least one data structure element may be tagged during this process to allow all connected elements to be defined as part of the system.

Manual semantic tagging is accomplished by the system with user input. As an example, this form of tagging may be performed during the installation of the system as whole, groups of connected elements, or individual connected elements. Similar to automatic semantic tagging each data structure for each connected element is examined or known to a user. Once the user identifies what data structure element is defined, a user may then select a mapping to a corresponding taxonomy. Once tagged with this taxonomy it in turn becomes part of that connected elements data structure. At least one data structure element may be tagged during this process to allow all connected elements to be defined as part of the system. Other tools may be available to assist the user in identification of the particular data structure elements for the particular connected elements. Such tools may be used during commissioning of the entire system or portions of the system.

Figure 3C:
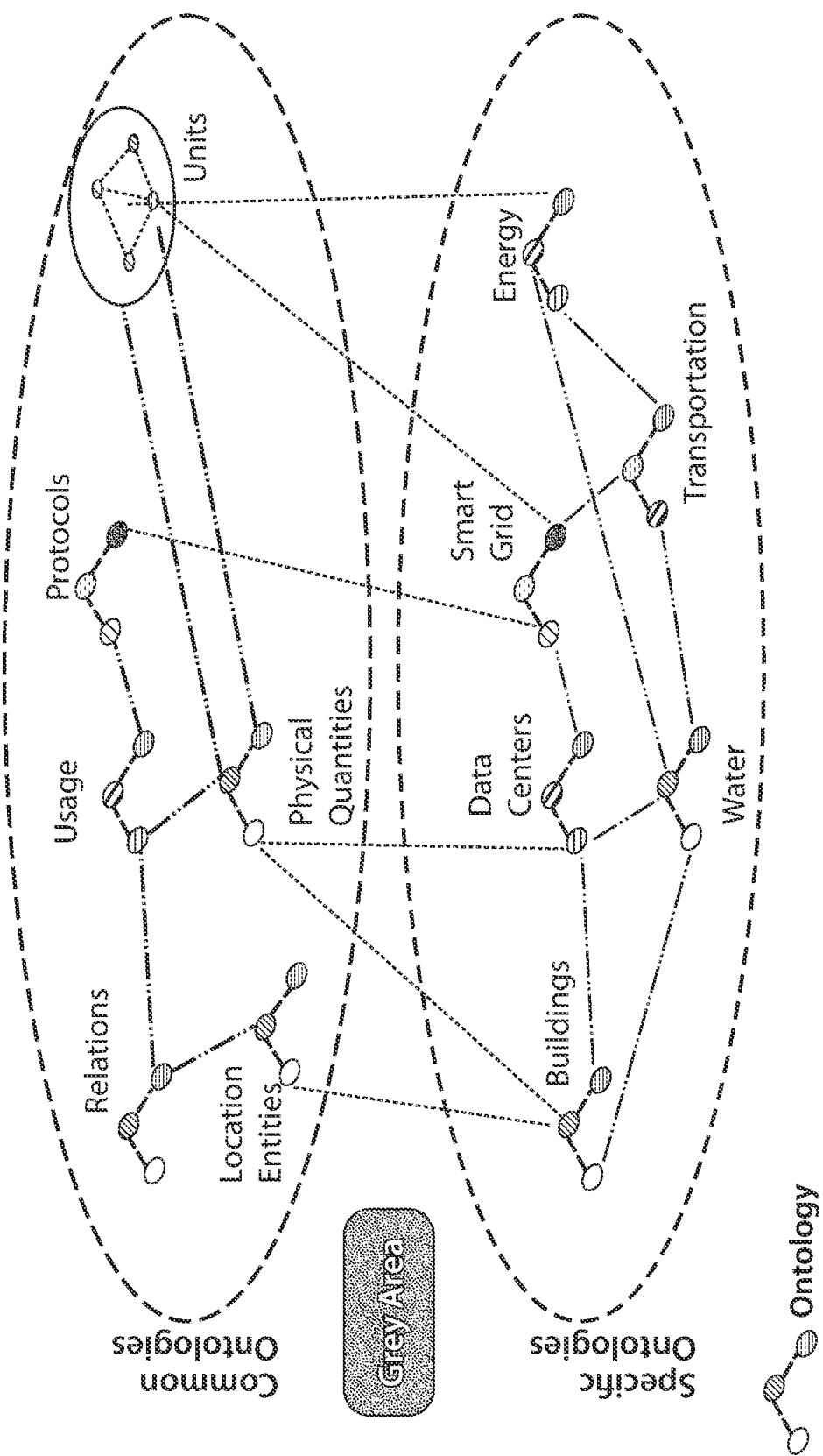
FIG. 3C illustrates exemplary data organization constructs of connected elements across a system that facilitates a semantic search.

FIG. 3C illustrates exemplary data organization constructs of connected elements across a system that facilitates a semantic search. It should be appreciated that any connected element type in any combination may exist in any geographic location and include additional information within a respective data structure. These exemplary data organization illustrates examples of ontologies such as protocols or usage as well as ontologies specific to the application such as data center or buildings.

As detailed herein heterogeneity among devices and systems across domains is a primary concern. A solution to the data challenge is the use of structured semantic queries that solves two distinct problems. First, is to solve the issue of data heterogeneity delivered from a connected system which contains various data structures. Second is to filter and aggregate this heterogeneous data from the connected elements and provide only required and relevant data to a user, cloud platform, or other repository. To aide in a solution two sets of ontologies were defined, common ontologies and specific ontologies, as illustrated in FIG. 3C.

Common ontologies may consist of concepts which occur more regularly. Examples may include concepts such as protocols, which classify communication protocols and information regarding the supported communication medium and range. Physical quantities, which may expose the measured or calculated environment concepts, such as energy. Units, may be used by the physical quantities to express a quantity and/or unit. Topological relations may classify the relations between entities and specifies the property of such relations such as transitive, symmetric. Further it may express a relationship such as is-ConnectedTo which may capture several elements like the electrical wiring and/or network connectivity. Localization may set a common definition such as building, wing, and/or floor. An ontology may define concepts along with the relationships. For example, a room isLocatedIn floor where isLocatedIn is a transitive relation. Usage may be combined with the other common ontologies, for example, instance the active energy for lighting or the outside-air temperature.

Common ontologies may be extensible due to the expressiveness of the ontology web language. Specific ontologies are domain oriented and are associated with the common ontologies. FIG. 3C illustrates an example that common and specific ontologies for data center ontology would rely on the physical quantities to express the measurements and on the localization to add the concept of a rack. Such a concept will be added as a sub-concept of the general class Location from the Localization ontology. Therefore, any instance of the rack concept may still be queried due to the inference capability. It should be appreciated, specific ontologies may also be associated with and utilized by existing ontologies. Also, global and local ontologies may be hosted locally or in a could environment and all, none, or a subset may be deployed to any level of connected device to assist in annotating the device data.

Figure 3D:
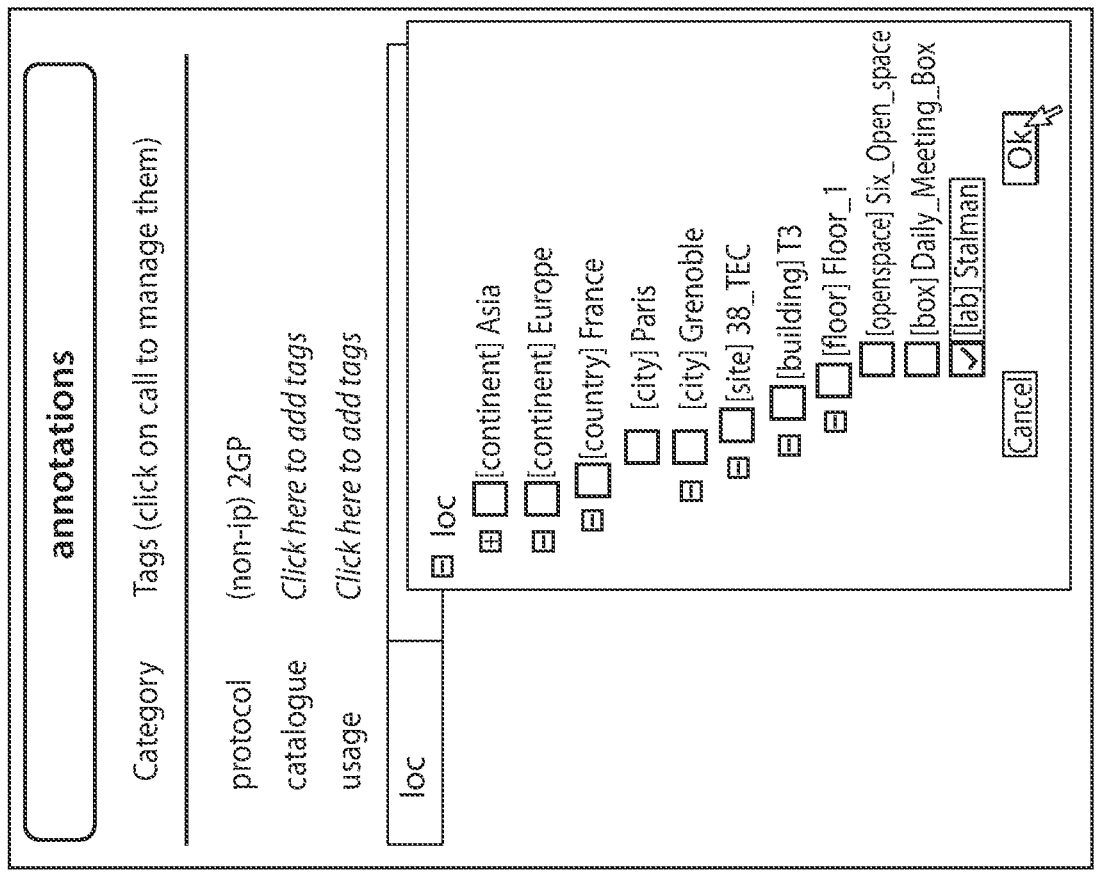
FIG. 3D illustrates exemplary data organization constructs within a user interface of connected elements across a system that facilitates a semantic search.
Figure 3D:
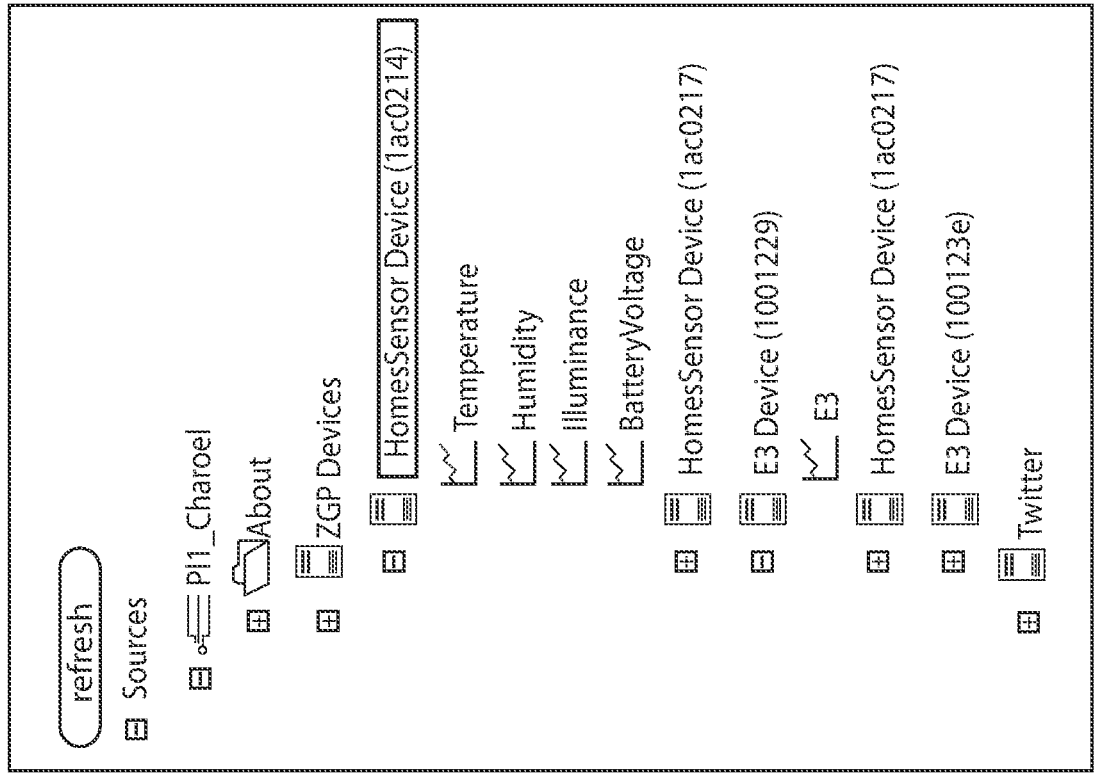

FIG. 3D illustrates exemplary output from a user interface which may be used to facilitate manual semantic tagging. Embodiments of automatic tagging include a driver processing the protocol communication along with data decoding to a representation of a gateway's data model. For example, a Modbus driver may decode and extract a data frame from a specific register along with identifying its structure in order to expose it in the gateway's data model. Automatic tagging is performed at the driver level for at least the Protocols, Units and Quantities. Even if the driver is capable of automatic annotation of part of the data, contextual information such as usage and location may only be known at the gateway and may be specified at the commissioning phase.

Commissioning, may be processed through a user interface at the gateway installation phase after all the wiring and pairing has been performed. For example, the usage of the sensor along with its location are known only the commissioning phase. At this phase an installer may rely on a commissioning tool in order to tag the data from both the Usage and Location ontologies. FIG. 3D shows an example from a gateway, where an installer has selected a sensor and is tagging the physical location by relying on the Location ontology module. The commissioning tool provides, among other features, the installer with a location template, based on the Location ontology, in order to instantiate the device within a facility, such as a building, wing, floor, room, and/or closet.

Once the process of semantic tagging is completed, a digital representation of the physical system is stored in one or more memory within the system. Each connected element will be represented by a corresponding data structure. Each data structure will contain data structure elements that describe the characteristics of the connected element. As one of many examples, the connected element possessing a carbon dioxide sensor 330, will possess an associated data structure describing the characteristics of the sensor. Each data structure will be composed of a number of data structure elements. Each connected element will possess a data contracture and one or more data structure elements. Data structure elements for this carbon dioxide sensor 330 may include, physical quantities (carbon dioxide), measured units (Parts Per Million), location (North Building, Floor 1, Zone 3), protocol (MODBUS), network (wired, IP address), and usage (buildings).

It should be appreciated that while each connected element will have an associated data structure, the number of data structure elements may vary based on the particular configuration or application. Once the connected elements data structures are organized in this way, multi-dimensional analysis may be performed without discrete or in depth knowledge of the physical system and the associated connected elements.

Figure 4A:
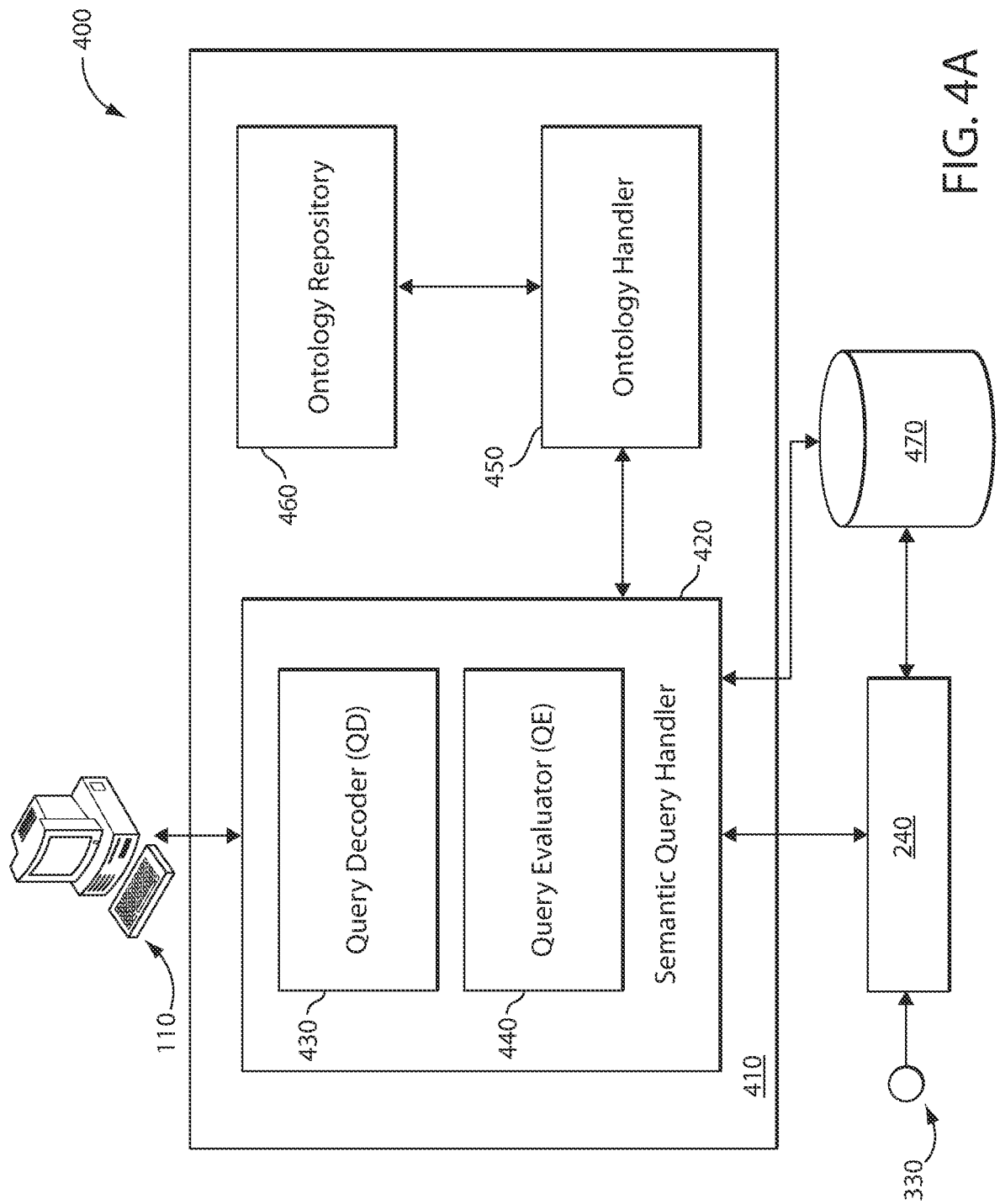
FIG. 4A is a block diagram of components of the system for a semantic search method in accordance with various embodiments of this disclosure.

FIG. 4A is a block diagram of the system components for a semantic search method 400 in which various embodiments of the present disclosure may be implemented. It is possible for either a user and/or another process from a machine to begin a semantic search. A user-initiated search may begin at a general purpose computer 110, in other implementations a machine-initiated process may derive from any other process in the system. It should be appreciated the methods of initiation of a semantic search are not mutually exclusive from each other. In both cases, the query processed by the Semantic Search Engine 410, is a structured search query with a particular grammar. This grammar structure may include the use of various data structure elements as command data elements, which include, filtering, basic aggregation, publish and subscribe, and inferential functions. Once the data source associated with the connected elements has been identified these command data elements may be used to act upon current or historic data values associated with the set of connected elements.

In one embodiment, a structured search query may include one or more filtering expressions. Search Device protocol: ZigBee and quantity: temperature and location: Lab101 With (name==TempSensor and value>22 and with unit==_F) will search for ZigBee wireless sensors in Lab 101 named "TempSensor" with values greater than 22 F. Protocol and location tags may be attached to the device level, however, the quantity may be attached to the variable measuring temperature. The semantic search engine will take into account the variables of a device when performing the search.

In an alternate embodiment, basic aggregation functions are supported such as Min, Max, Sum, Avg. For example, Sum Variable measures:ActiveEnergy and usage:Lighting and location:Building2 calculates the sum of all active lighting sources in Building 2. It should be appreciated a wide variety of mathematical functions are contemplated as part of this disclosure and any listed are by way of example only.

In another embodiment, Publish and/or Subscribe functionalities, may be applied to connected elements in a specific location for a given measurement type. Publish functions are contemplated for a user and/or system to publish any collected data to a location of choice. Examples of these locations may include a cloud environment, website address, REST endpoint, mobile device, disc array, or any other appropriate destination for the data. In one embodiment, the publish functions allow a "push" of data to a specific location or service for possible future action or analysis. Subscribe functions are contemplated for a user and/or system to handle situations where devices appear/disappear at a specific location for a given measurement type. Such a function may also generate alerts and notifications when an event of interest occurs, for example, if an event on change compared to a user defined threshold. Such subscriptions are configurable according to the system or user requirements.

For example, it is possible to subscribe to an event by checking the value of a temperature sensor every 10 minutes for the next month at a particular location and generate an alert every time the temperature value is higher than a specific value. The semantic search engine is also capable of collecting data and pushing to a cloud environment or to a remote REST endpoint. As an example, Collect Device (quantity:temperature or quantity:humidity) or (quantity: ActiveEnergy and usage:mainMeter)) and @loc:floor1 From 2016-03-21 To 2017-03-21 every 00:10:00 towards http://MyRestEndpoint.com/rest. This query collects the two types of devices on floor1. The semantic search query will push this data for a year, every 10 min to the indicated REST endpoint.

In another embodiment, inferential functions such as @type:sensor may utilize a defined data source infers relationships between connected elements. Embodiments of the semantic search engine have an inference engine to reason and answer wider queries. The inference feature may be specified at query time. As an example, a given connected device may be annotated with Stallman lab which is located in Floor 1 and building T3. An example of a query relying on the inference may be Search device @location:T3. Although there is no device tagged with location: T3, this query will still return the device after applying the inference (since Stallman is located in T3). The special character @ on a tag is a request to apply the inference feature. An inference is applicable, for example, on the location and the device type tags such as @type:sensor which is the parent class of all the sensors.

Structured search queries are received into Semantic Query Handler 420, which is composed of the Query Decoder (QD) 430 and the Query Evaluator (QE) 440. The Query Decoder (QD) 430 analyses the structured search query and deconstructs it into query elements. Query elements are passed to the Query Evaluator (QE) 440, to analyze the query elements and perform operations on the system based on the analysis and develop a semantic search query resultant data set. In an implementation, query elements may be used to actuate, operate, and/or change data values associated with connected elements.

A structured search query may include an inferential function regarding a particular connected element. In this case the discrete connected element is not known, but information regarding same is requested. Here, further analysis is performed by the Ontology Handler 450, which further processes the data structure elements for the inferential reference contained in the structured search query and accesses the Ontology Repository 460 for the available inferential references to the appropriate connected elements. It is to be appreciated ontological operations may include developing graphical data structures utilizing device and/or device location data relationships.

For example, a connected element is a carbon dioxide sensor 330 queried by a user for the value of the environment. A user inputs a structured query into a general purpose computer 110. The Query Decoder (QD) 430 decompiles the structured search query and passes the query elements to the Query Evaluator (QE) 440 that performs operations to collect the data. In an example, one query element may be used to identify the connected elements of locations of the connected elements that will be used to define a data source. In this example, only the current value of carbon dioxide at the sensor 330 is requested. In another example, a query example may identify all connected elements associated with a floor, wing, and/or section, of one or more buildings or facilities. The Query Evaluator (QE) 440, requests the complete data structure for the connected element. This data structure is transmitted from the connected element acting as a gateway device 240 for the carbon dioxide sensor 330. The entire data structure of the carbon dioxide sensor 330 is collected from the connected element acting as a gateway device 240 and the data is transmitted to the Semantic Query Handler 420 and to the general purpose computer 110. It should be appreciated that the data structures for analysis may be from near real time connected elements such as the connected element acting as a gateway device 240 or data repositories 470 which contain the data structures. Such decisions are based on state of the system and the structured search query.

Figure 4B:
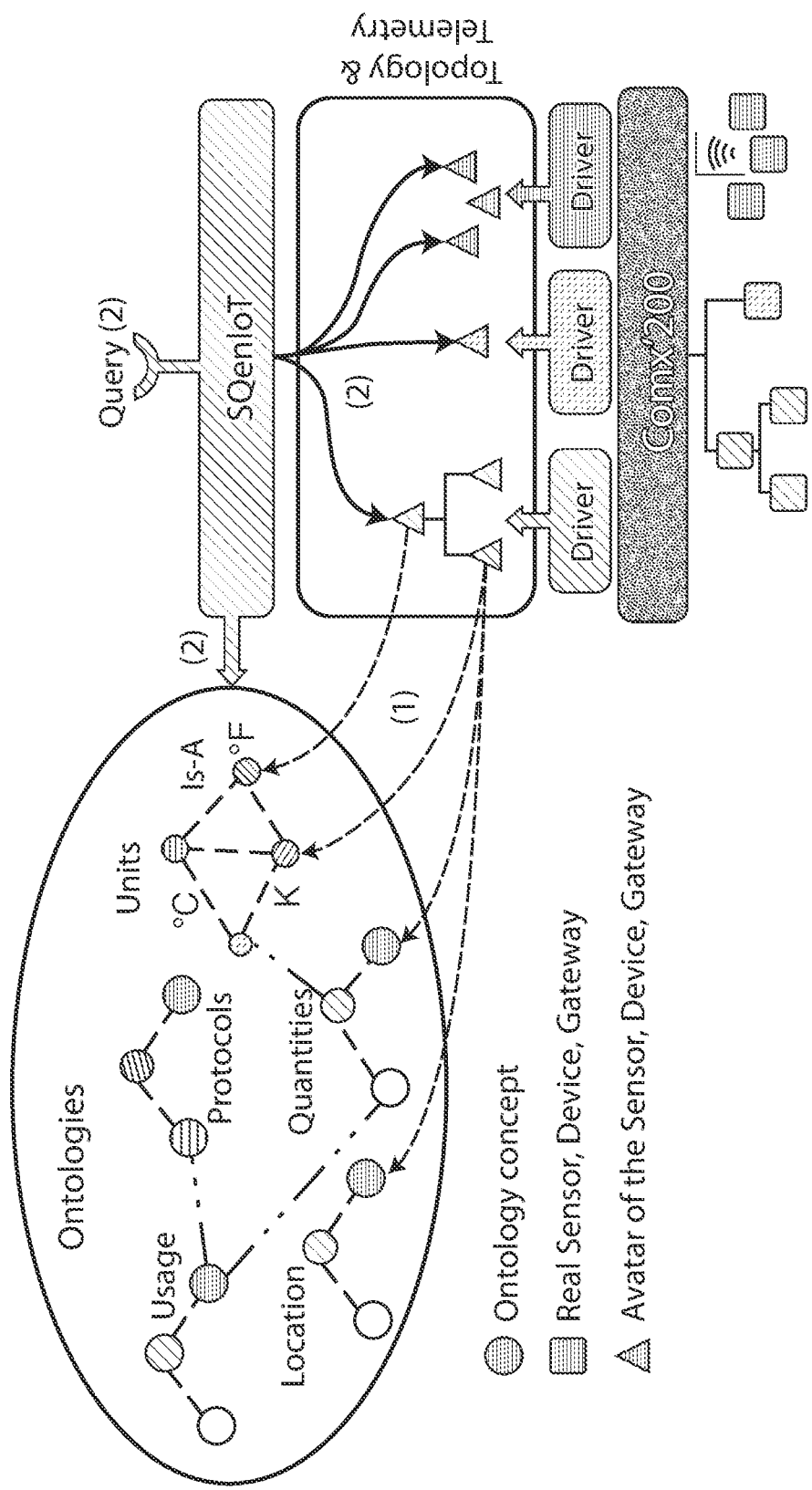
FIG. 4B is an alternate representation of components of the system for a semantic search method in accordance with various embodiments of this disclosure.

FIG. 4B is an example of an implementation of components of the system for a semantic search method in accordance with various embodiments of this disclosure. An annotation is the process of linking concepts from common or/and global ontologies with the actual data exposed by the gateways, as shown in FIG. 4B. With many multi-protocol gateway devices, physical sensors, devices and/or gateways may be represented internally in a data model or an avatar which resides in memory or retained as a data structure. A semantic tag may be a triplet of data composed of an ontology module reference, a concept or a verb, and/or an optional instance from the ontology. A semantic tag may be added to the internal representation (data model or avatar) at the gateway or other level. A semantic tag may be added on a device or a variable representation. As one example Unit: ° C. and Protocol:Modbus are examples of two semantic tags referencing respectively the Unit (represented as Protocol) and the instance ° C. (represented as modbus) in the ontology modules. The Protocol:modbus tag may be added at for example, a meter level, while the Unit: ° C. tag may be added at the variable level. The conversion rule between ° C. and ° F. for example may be expressed and stored as a rule in the Units ontology. It should be appreciated, there are at least two different semantic tagging mechanisms, automatic tagging and commissioning.

Figure 5A:
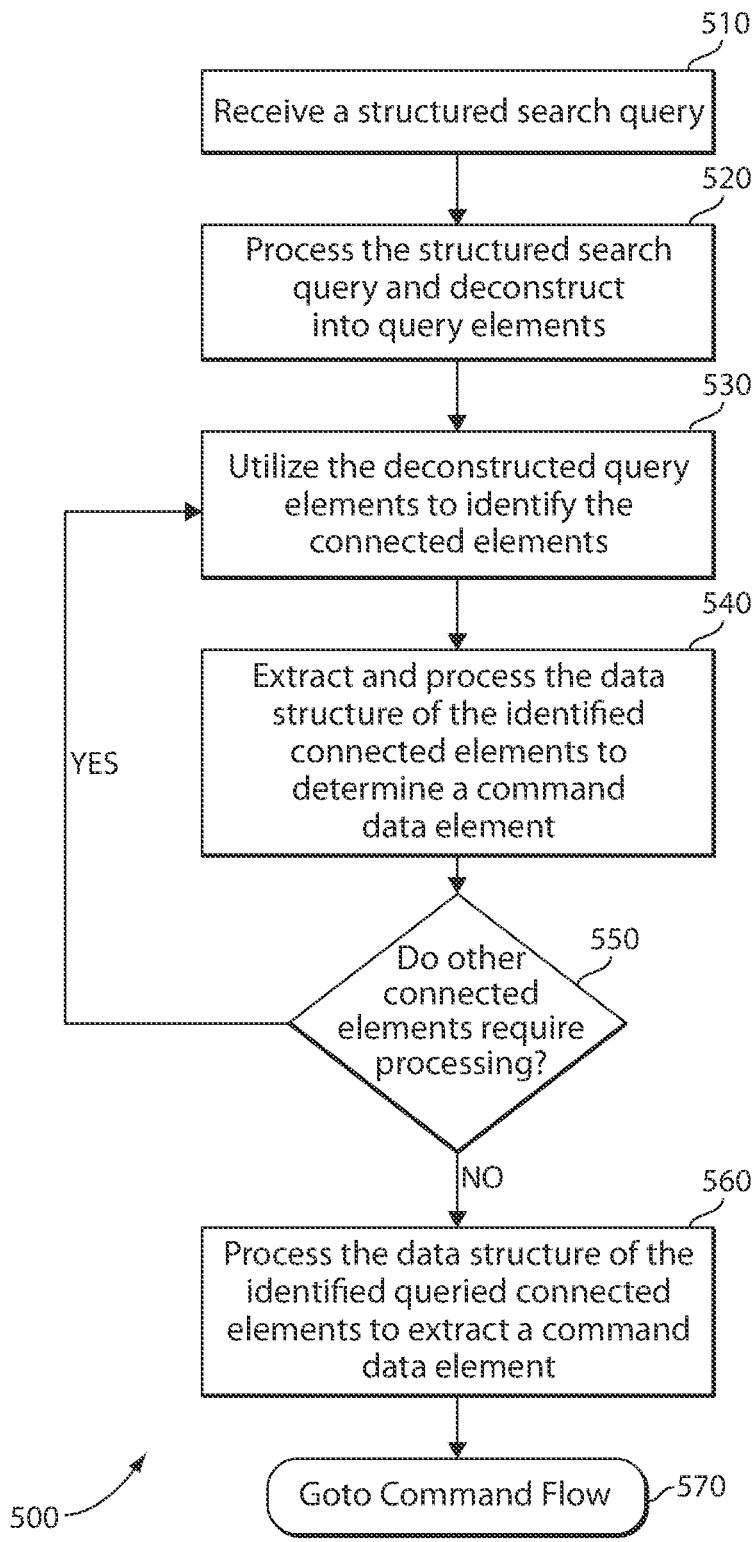
FIG. 5A is a flow diagram for executing a semantic search method in accordance with various embodiments of this disclosure.

FIG. 5A is a flow diagram of a semantic search method 500 in accordance with various embodiments of this disclosure. As discussed, a structured search query is received for one or more connected elements 510. It should be appreciated that one or more connected elements may be the target of the semantic search. This query is received from a user or another machine. Once received, the structured search query is deconstructed into its composite query elements 520. Query elements are processed by the Semantic Search Engine to identify which set, subset, class, and/or group of the connected set of elements and/or classes of connected elements require examination of their respective data structure 530. The data structure for each identified connected element extracted and processed to determine what data structured elements match the query elements of the structured search query and to determine a command data element 540. This command data element is used to determine additional processing required to complete the structured search query. Embodiments of the disclosure allow for analysis of multiple data structure elements of multiple data structures, which correspond to multiple connected elements. Decisions are made to determine if other processing is necessary 550. If not, processing is performed for the data structure on each identified connected element to determine the command data element for each identified connected element 560. Commands are then separated by type 570.

Figure 5B:
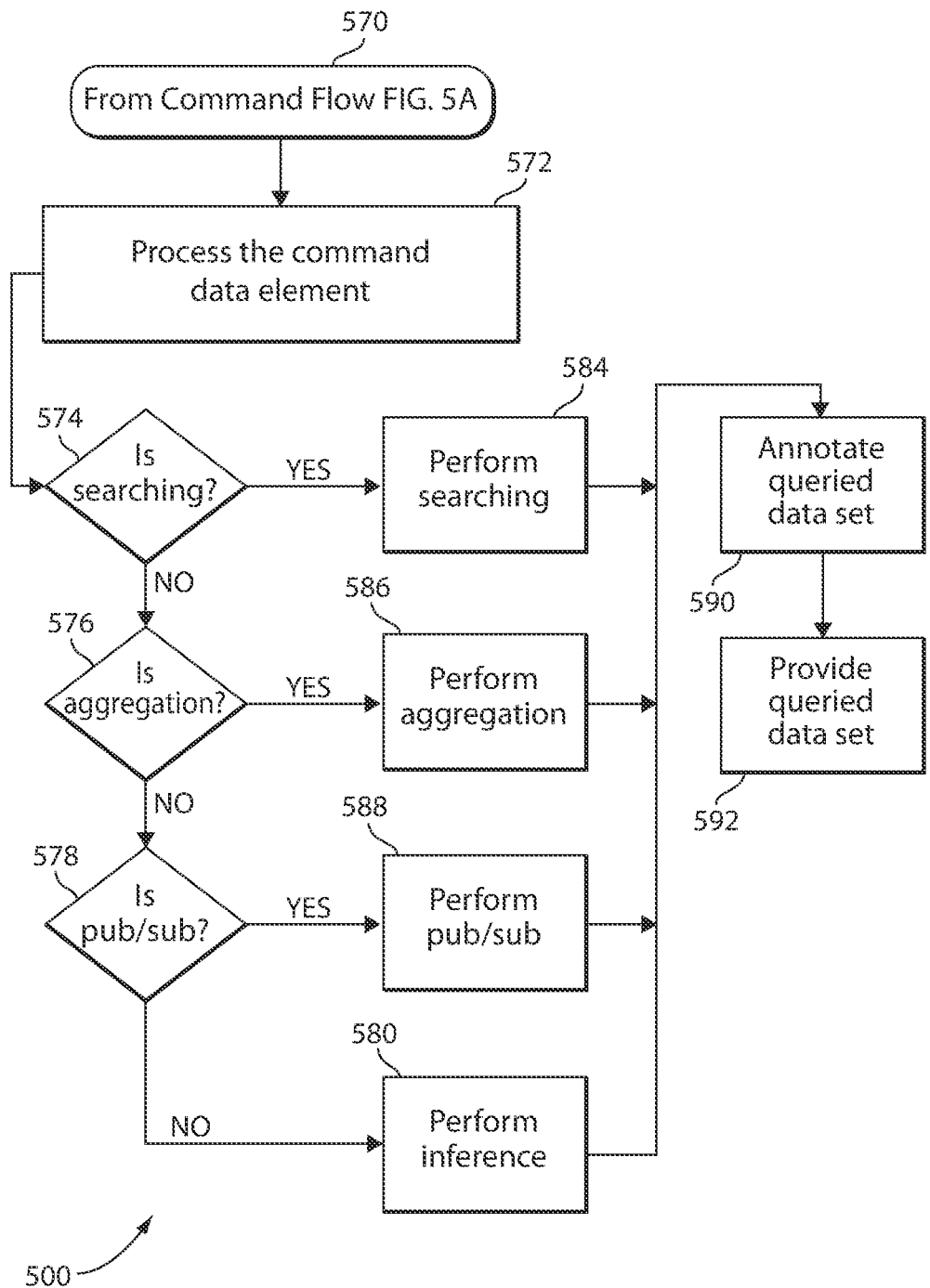
FIG. 5B is a flow diagram of exemplary command functions for a method for a semantic search method.

FIG. 5B is a flow diagram of exemplary command functions for a method for a semantic search method. From FIG. 5 commands are separated by type 570. Command data is processed to determine further processing. These types include searching commands 574, aggregation commands 576, publishing and subscription commands 578, and localized inference commands. Once the determination is made, the command is carried out for searching 584, aggregation 586, publishing and subscription 588, and localized inference 580. Once the result of processing the commands is complete for all identified connected elements, annotation of the data is performed to form a queried data set 590. This queried data set is the result of the initial query along with any actions taken as part of the commands processed. This queried data set is provided 592 to the general-purpose computer to be used by the user and/or the system that made the initial query.

In one example, the semantic search engine may be used as a method to autonomously turn off light fixtures in a building at a pre-determined time. In such an example, a user or system initiates a search query at a pre-determined time (such as 8:00 PM) to determine what light fixtures in a building are connected, and operating. A data set of existing light fixtures in a building is determined as is a current state of the light fixtures (ON or OFF). If it is determined a light fixture is ON, the fixture is commanded to OFF. A complete reporting of the before state, after state, exceptions, and/or results may be made available to a user, system, and/or archived in a repository such as a cloud environment, and/or disk array. It is to be understood, other such autonomous actions are possible utilizing various embodiments of this disclosure.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 6:
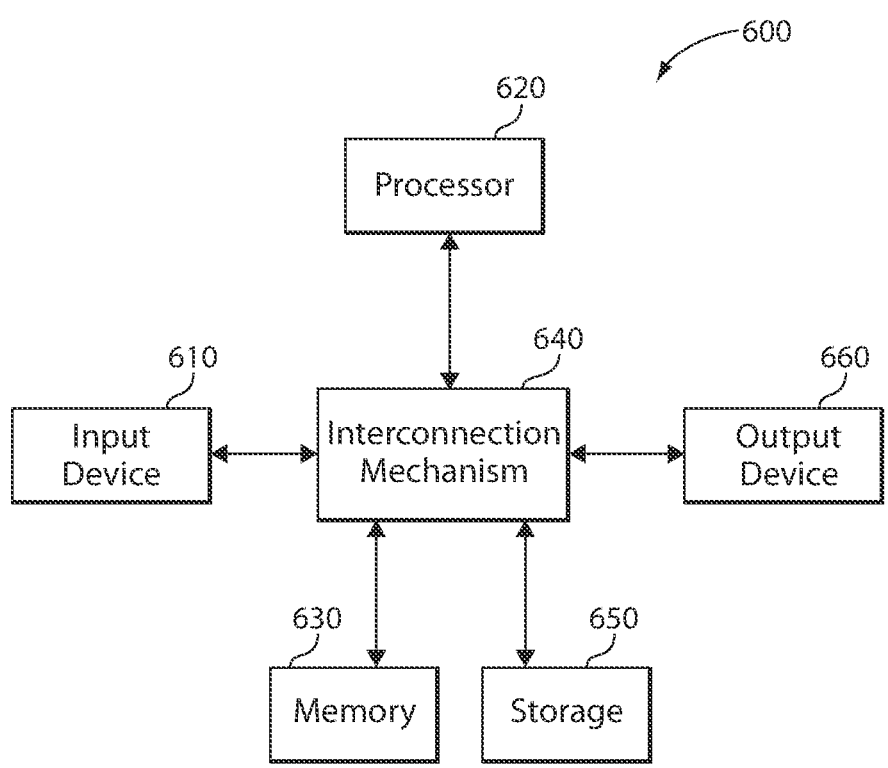
FIG. 6 is a functional block diagram of a general-purpose computer system in accordance with embodiments of this disclosure.

For example, various embodiments of the disclosure may be implemented as specialized software executing in a general-purpose computer system 600 such as that shown in FIG. 6. The computer system 600 may include a processor 620 connected to one or more memory devices 630, such as a disk drive, memory, or other device for storing data. Memory 630 is typically used for storing programs and data during operation of the computer system 600. The computer system 600 may also include a storage system 650 that provides additional storage capacity. Components of computer system 600 may be coupled by an interconnection mechanism 640, which may include one or more busses (e.g., between components that are integrated within the same machine) and/or a network (e.g., between components that reside on separate discrete machines). The interconnection mechanism 640 enables communications (e.g., data, instructions) to be exchanged between system components of system 600.

Computer system 600 also includes one or more input devices 610, for example, a keyboard, mouse, trackball, microphone, touch screen, and one or more output devices 660, for example, a printing device, display screen, speaker. In addition, computer system 600 may contain one or more interfaces (not shown) that connect computer system 600 to a communication network (in addition or as an alternative to the interconnection mechanism 640).

Figure 7:
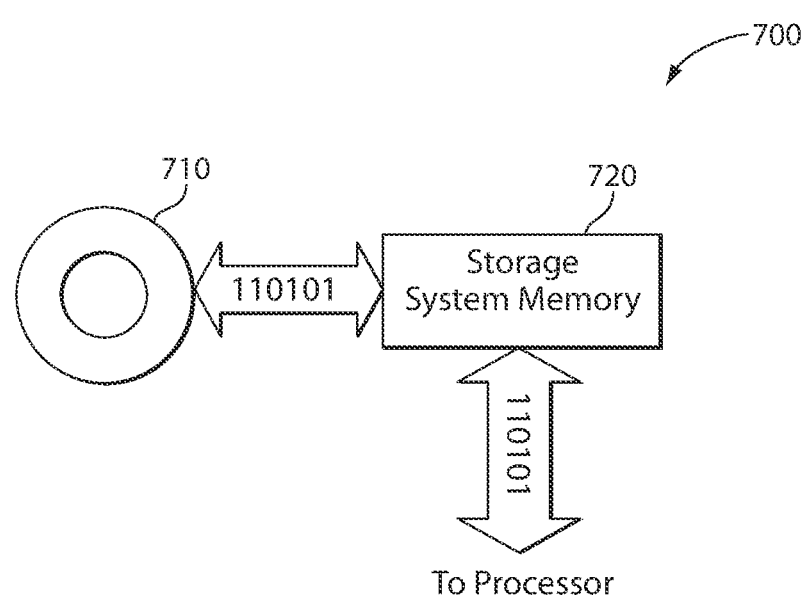
FIG. 7 is a functional block diagram of a general-purpose storage system in accordance with the general-purpose computer system of FIG. 6.

The storage system 650, shown in greater detail in FIG. 7, typically includes a computer readable and writeable nonvolatile recording medium 710 in which signals are stored that define a program to be executed by the processor or information stored on or in the medium 710 to be processed by the program to perform one or more functions associated with embodiments described herein. The medium may, for example, be a disk or flash memory. Typically, in operation, the processor causes data to be read from the nonvolatile recording medium 710 into another memory 720 that allows for faster access to the information by the processor than does the medium 710. This memory 720 is typically a volatile, random access memory such as a dynamic random access memory (DRAM) or static memory (SRAM). It may be located in storage system 700, as shown, or in memory system 630. The processor 620 generally manipulates the data within the integrated circuit memory 630, 720 and then copies the data to the medium 710 after processing is completed. A variety of mechanisms are known for managing data movement between the medium 710 and the integrated circuit memory element 630, 720, and the disclosure is not limited thereto. The disclosure is not limited to a particular memory system 630 or storage system 650.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the disclosure may be practiced, it should be appreciated that aspects of the disclosure are not limited to being implemented on the computer system as shown in FIG. 7. Various aspects of the disclosure may be practiced on one or more computers having a different architecture or components shown in FIG. 7. Further, where functions or processes of embodiments of the disclosure are described herein (or in the claims) as being performed on a processor or controller, such description is intended to include systems that use more than one processor or controller to perform the functions.

Computer system 600 may be a general-purpose computer system that is programmable using a high-level computer programming language. Computer system 600 may be also implemented using specially programmed, special purpose hardware. In computer system 600, processor 620 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A non-transitory computer-readable medium containing computer program code that, when executed by operation of one or more computer processors, performs an operation for processing a semantic search query, the operation comprising:
 upon receiving a structured search query wherein the structured search query is configured with a particular grammar that includes query elements that facilitate at least one of filtering, aggregation, publish, subscribe, or inferential functions, and wherein a defined data source is filtered for a data field associated with one or more connected elements and includes including an inferential function indicating an inferential query concept, deconstructing the structured search query into query elements;
 determining, by operation of one or more computer processors, a set of connected elements which define the data source based on at least one of the query elements, the at least one query element matching a first data structure element of a plurality of data structure elements of a data structure corresponding to a connected element of a plurality of connected elements, wherein the plurality of data structure elements are assigned tags linking respective data structure elements with a corresponding concept of at least a common ontology or a domain specific ontology, wherein determining the set of connected elements further comprises identifying, using the common ontology and the domain specific ontology, one or more connected elements having at least one of a domain-specific concept or a non-domain-specific concept that corresponds to the inferential query concept; determining a command data element associated with the received structured search query by processing the data structure of the identified set of connected elements;
 utilizing the command data element to process the data structure of the identified set of connected elements based on the structured search query;
 annotating the data structure of each of the identified set of connected elements to form a queried data set; and
 providing the queried data set in response to receiving the structured search query.

2. The non-transitory computer-readable medium of claim 1, wherein the defined data source is configured for use by an inference engine to infer relationships between connected elements, wherein the inference engine is configured to infer relationships between connected elements by performing one or more ontological operations that include developing graphical data structure with device and device location data relationships.

3. The non-transitory computer-readable medium of claim 1, further comprising:
 identifying actionable connected elements within the defined data source; and
 updating a data value associated with a connected element,
 wherein one or more connected elements of the plurality of connected elements comprise virtual elements.

4. A system for processing a semantic search query, the system including a memory and a processor coupled to the memory and being configured to:
 upon receiving a structured search query wherein the structured search query is configured with a particular grammar that includes query elements that facilitate at least one of filtering, aggregation, publish, subscribe, or inferential functions, and wherein a defined data source defined data source is filtered for a data field associated with one or more connected elements and includes including an inferential function indicating an inferential query concept, deconstructing the structured search query into query elements;
 determining, by operation of one or more computer processors, a set of connected elements which define the data source based on at least one of the query elements, the at least one query element matching a first data structure element of a plurality of data structure elements of a data structure corresponding to a connected element of a plurality of connected elements, wherein the plurality of data structure elements are assigned tags linking respective data structure elements with a corresponding concept of at least a common ontology or a domain specific ontology, wherein determining the set of connected elements further comprises identifying, using the common ontology and the domain specific ontology, one or more connected elements having at least one of a domain-specific concept or a non-domain-specific concept that corresponds to the inferential query concept;
 determining a command data element associated with the received structured search query by processing the data structure of the identified set of connected elements;
 utilizing the command data element to process the data structure of the identified set of connected elements based on the structured search query;
 annotating the data structure of each of the identified set of connected elements to form a queried data set; and
 providing the queried data set in response to receiving the structured search query.

5. The system of claim 4, wherein the associated data field is selected from a group including device type, class, capability, or communication protocol.

6. The system of claim 4, wherein data from the defined data source is aggregated using a mathematical operation comprising at least one of a min, max, sum, or average operation.

7. The system of claim 4, wherein the defined data source is published or subscribed for connected elements.

8. The system of claim 4, wherein the defined data source is configured for use by an inference engine to infer relationships between connected elements, wherein the inference engine is configured to infer relationships between connected elements by performing one or more ontological operations that include developing graphical data structure with device and device location data relationships.

9. The system of claim 4, wherein the command data element type includes operational elements for actuating at least one of the connected elements associated with the defined data source.

10. The system of claim 4, further comprising:
identifying actionable connected elements within the defined data source; and
updating a data value associated with a connected element,
wherein one or more connected elements of the plurality of connected elements comprise virtual elements.

11. A method of processing a semantic search query, comprising:
receiving, a structured search query wherein the structured search query is configured with a particular grammar that includes query elements that facilitate at least one of filtering, aggregation, publish, subscribe, or inferential functions, and wherein a defined data source defined data source is filtered for a data field associated with one or more connected elements and includes including an inferential function indicating an inferential query concept, deconstructing the structured search query into query elements;
determining, by operation of one or more computer processors, a set of connected elements which define the data source based on at least one of the query elements, the at least one query element matching a first data structure element of a plurality of data structure elements of a data structure corresponding to a connected element of a plurality of connected elements, wherein the plurality of data structure elements are assigned tags linking respective data structure elements with a corresponding concept of at least a common ontology or a domain specific ontology, wherein determining the set of connected elements further comprises identifying, using the common ontology and the domain specific ontology, one or more connected elements having at least one of a domain-specific concept or a non-domain-specific concept that corresponds to the inferential query concept;
determining, a command data element associated with the received structured search query by processing the data structure of the identified set of connected elements;
utilizing, the command data element to process the data structure of the identified set of connected elements based on the structured search query;
annotating, the data structure of each of the identified set of connected elements to form a queried data set; and
providing, the queried data set in response to receiving the structured search query.

12. The method of claim 11, wherein the associated data field is selected from a group including device type, class, capability, or communication protocol.

13. The method of claim 11, wherein data from the defined data source is aggregated using a mathematical operation that includes at least one of a min, max, sum, or average operation.

14. The method of claim 11, wherein the defined data source is published or subscribed for connected elements.

15. The method of claim 11, wherein the defined data source is configured for use by an inference engine to infer relationships between connected elements, wherein the inference engine is configured to infer relationships between connected elements by performing one or more ontological operations that include developing graphical data structure with device and device location data relationships.

16. The method of claim 11, wherein the command data element types includes operational elements for actuating at least one of the connected elements associated with the defined data source.

17. The method of claim 11, further comprising:
identifying actionable connected elements within the defined data source; and
updating a data value associated with a connected element,
wherein one or more connected elements of the plurality of connected elements comprise virtual elements.

* * * * *